United States Patent
Imbert et al.

(10) Patent No.: US 11,422,052 B2
(45) Date of Patent: Aug. 23, 2022

(54) SYSTEM AND METHOD FOR DIAGNOSING A ROTOR UNBALANCE OF A WIND TURBINE

(71) Applicant: SEREEMA, Montpellier (FR)

(72) Inventors: Jerome Imbert, La Grande Motte (FR); Bruno Pinto, Montpellier (FR); Kevin Michel, Montpellier (FR)

(73) Assignee: SEREEMA, Montpellier (FR)

( * ) Notice: Subject to any disclaimer, the term of this patent is extended or adjusted under 35 U.S.C. 154(b) by 0 days.

(21) Appl. No.: 16/764,767

(22) PCT Filed: Nov. 15, 2018

(86) PCT No.: PCT/FR2018/052849
§ 371 (c)(1),
(2) Date: May 15, 2020

(87) PCT Pub. No.: WO2019/097167
PCT Pub. Date: May 23, 2019

(65) Prior Publication Data
US 2020/0363282 A1 Nov. 19, 2020

(30) Foreign Application Priority Data
Nov. 15, 2017 (FR) ...................................... 1760715

(51) Int. Cl.
*G01M 1/28* (2006.01)
*F03D 17/00* (2016.01)
(Continued)

(52) U.S. Cl.
CPC .............. *G01M 1/28* (2013.01); *F03D 17/00* (2016.05); *G01M 1/22* (2013.01); *G01P 15/18* (2013.01);
(Continued)

(58) Field of Classification Search
CPC ........... G01M 1/28; G01M 1/22; F03D 17/00; G01P 15/18; F05B 2240/21
See application file for complete search history.

(56) References Cited

U.S. PATENT DOCUMENTS

| 2006/0140761 A1* | 6/2006 | LeMieux | ................ F03D 7/042 416/61 |
| 2009/0162186 A1* | 6/2009 | Christinsen | .............. G01H 1/06 415/1 |

(Continued)

FOREIGN PATENT DOCUMENTS

| EP | 1719910 A1 | 11/2006 |
| EP | 2472238 A1 | 7/2012 |

(Continued)

*Primary Examiner* — Eman A Alkafawi
*Assistant Examiner* — Aeysha N Sultana
(74) *Attorney, Agent, or Firm* — Craft Chu PLLC; Andrew W. Chu (57) ABSTRACT

The diagnostic system for diagnosing a rotor imbalance of a wind turbine based on acceleration data measured on a nacelle of a wind turbine which is supported by a tower includes a measuring device provided with a triaxial vibration sensor suitable for measuring acceleration data corresponding to vibrations occurring on the nacelle. The system also includes a processing system for processing the acceleration data, suitable for determining the rotor imbalance according to the acceleration data measured on at least two axes on the nacelle. The invention also relates to a method for diagnosing the rotor imbalance of a wind turbine.

13 Claims, 3 Drawing Sheets

(51) Int. Cl.
*G01M 1/22* (2006.01)
*G01P 15/18* (2013.01)

(52) U.S. Cl.
CPC ....... *F05B 2240/21* (2013.01); *F05B 2260/80* (2013.01)

(56) References Cited

U.S. PATENT DOCUMENTS

| | | | |
|---|---|---|---|
| 2009/0266160 A1* | 10/2009 | Jeffrey | F03D 13/35 |
| | | | 73/455 |
| 2010/0133828 A1* | 6/2010 | Stegemann | F03D 7/0292 |
| | | | 290/44 |
| 2012/0183399 A1 | 7/2012 | Perkinson | |
| 2014/0046881 A1* | 2/2014 | Losl | G05B 23/0245 |
| | | | 706/14 |
| 2018/0142676 A1* | 5/2018 | Pedersen | F03D 7/0224 |
| 2021/0033066 A1* | 2/2021 | Beckerman | F03D 7/0296 |

FOREIGN PATENT DOCUMENTS

| | | | | |
|---|---|---|---|---|
| EP | 2565444 B1 * | 2/2019 | ............ | G01H 1/003 |
| WO | 2009000787 A2 | 12/2008 | | |
| WO | 2009129617 A1 | 10/2009 | | |
| WO | 2016169963 A1 | 10/2016 | | |
| WO | 2016169964 A1 | 10/2016 | | |
| WO | 2018171852 A1 | 9/2018 | | |

\* cited by examiner

SYSTEM AND METHOD FOR DIAGNOSING A ROTOR UNBALANCE OF A WIND TURBINE

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention is in the field of sustainable development, renewable energy, and more specifically wind power. Indeed, the invention refers to a system for diagnosing a rotor imbalance of a wind turbine.

2. Description of Related Art Including Information Disclosed Under 37 CFR 1.97 and 37 CFR 1.98

As part of the development of renewable energy, numerous wind farms have been quickly installed. The operators of those wind farms have had to set up solutions for monitoring and maintaining the operating condition of each wind turbine in their wind farm. Consequently, the operating condition of each wind turbine is an essential piece of data for optimizing energy production and preventing risks of damage.

Given this context, it is known that rotor imbalance of a wind turbine may be a source of information on blade wear, the physical condition of the blades, or the assembly status thereof.

So, technical solutions have been developed to optimize the operation of a wind turbine.

A first solution described by document US 2012/0183399 consists of a system for balancing the rotor and blades of a wind turbine. To that end, the balancing system uses a measurement device comprising a rotor vibration sensor and rotational speed sensor of the electromagnetic type. In particular, this is achieved through an imbalance measurement method with N different pitch configurations of the blades followed by, on the one hand, a calculation step for estimating the necessary pitch correction of the blades and, on the other hand, a step for correcting the pitch of the blades. The balancing system corrects the rotor imbalance determined during the rotor rotation phases. It should be noted that the pitch of a blade corresponds to its tilt angle with respect to a zero reference at the rotor hub.

With the aim of correcting the rotor imbalance, the balancing system uses the acceleration data of the nacelle measured by the vibration sensor, the rotational speed data of the blades measured by the rotational speed sensor of the rotor, and the known pitch of the blades.

Depending on the type of wind turbine, such a balancing system implies a modification of the wind turbine's settings to take measurements at N pitch configurations of the blades. Such changes in pitch configuration may result in a drop in energy production. In addition, rotor imbalance is measured over short operating periods that are not very representative of the various operating conditions of a wind turbine. For example, this depends on the weather conditions to which a wind turbine is subjected, such as the direction and force of the wind, temperature, rain, snow, frost, and so on. In this context, measurements over a short period do not represent the variability of the vibrations acting on the rotor. Consequently, this method may require additional work and may raise the cost of maintaining the wind turbine.

A second solution described in document WO 2016/169964 consists of a balancing system that uses a pitch adjustment system of each rotor blade and a device for measuring the rotor imbalance. More specifically, the measurement device comprises an angle detector for detecting the pitch of each blade, a rotor rotational speed sensor, and at least one nacelle vibration sensor. The balancing system determines the imbalance of the rotor during certain periods of rotor rotation, for example two or three, with each rotation being chosen according to a predefined rotational speed of the rotor. Consequently, the rotor imbalance is determined as a function of the vibration data of the nacelle measured by the vibration sensor, and of the rotational speed data of the rotor measured by the rotational speed sensor of the rotor. In a second step, the balancing system corrects the pitch of one or more blades so as to correct the determined rotor imbalance. The balancing system thus repeats these steps until the rotor imbalance is eliminated. This balancing system also involves the drawback of modifying the settings of the wind turbine in order to take measurements under N pitch configurations of the blades. Such changes in pitch configuration may result in a drop in energy production. In addition, the diagnosis is conducted over periods not representative of the operating conditions of a wind turbine.

A third solution described by document WO 2009/129617 consists of a system for balancing the rotor imbalance of a wind turbine. To that end, the balancing system comprises a measurement device equipped with a rotational speed sensor of the rotor and three vibration sensors which are made of accelerometers. On an ad hoc basis, the sensors are precisely installed on the nacelle to measure vibrations along the rotor's axis of rotation and along two axes parallel to each other and perpendicular to the rotor's axis of rotation.

Once the measurement device is installed, a battery of tests is run to determine the two components of the rotor imbalance of a wind turbine, that is, the aerodynamic imbalance of the rotor and the mass imbalance of the rotor.

In order to define the aerodynamic imbalance of the rotor, measurements of acceleration data are taken during an operating period of the wind turbine. The acceleration data corresponding to the torsion vibrations of the nacelle and the axial vibrations are compared to the reference data emanating from a reference rotation cycle. When the acceleration data exceed a certain threshold, it means that the rotor is experiencing an aerodynamic imbalance. To detect the source of the problem, a visual inspection and/or a realignment of the blades is performed.

In addition, the mass imbalance is determined by measurements of acceleration data taken during an operating period of the wind turbine during which a weight is secured to a blade. Just like the first two cited solutions of the prior art, this third balancing system requires a shutdown of energy production to determine the rotor imbalance and to correct it. In addition, the rotor imbalance is also measured over a short period that is not very representative of the operating conditions of a wind turbine.

BRIEF SUMMARY OF THE INVENTION

Given that context, the applicant has developed an innovative and alternative system for diagnosing rotor imbalance. By means of continuous, routine measurements and analyses of acceleration data over significant operating periods of the wind turbine, the diagnostic system provides reliable data without interrupting energy production and without modifying the settings of the wind turbine.

To that end, a first aspect of the invention relates to a system for diagnosing a rotor imbalance of a wind turbine based on acceleration data measured at a nacelle of the wind turbine, which is supported by a tower, characterized in that it comprises:

a measurement device equipped with a vibration sensor for three axes, X, Y, and Z, which takes continuous, routine measurements of the acceleration data corresponding to vibration phenomena occurring on the nacelle; and A system for processing the acceleration data for determining the rotor imbalance through a vibration analysis based solely on the acceleration data measured for at least two axes of X, Y, Z at the nacelle without altering the normal operation of the wind turbine.

The diagnostic system of the invention makes it possible to determine a rotor imbalance through a vibration analysis based solely on measurements of acceleration data corresponding to vibration phenomena occurring on the nacelle. Advantageously, the system according to the invention makes it possible to determine the rotor imbalance of the wind turbine without modifying the operating settings such as the pitch angle of the rotor. Contrary to the prior art cited in the application, the diagnostic system according to the invention provides the operator of a wind farm with a diagnosis of the wind farm, without the need to stop each wind turbine in order to carry out a protocol of iterative tests aimed at determining the rotor imbalance of each wind turbine. This is a productivity gain for the wind farm operator and reduces the cost of obtaining a diagnosis.

According to a first aspect of the invention, the processing system comprises an analysis module that continuously analyzes acceleration data measured by the measurement device in order to determine an operating period Tf of the wind turbine, with the rotor imbalance being determined over a stable plurality of operating periods Tf of the wind turbine, which is defined by a stable frequency 3P of the blades passing in front of the tower.

More specifically, the analysis module determines an operating period Tf when it identifies vibrations V3P due to the passing of a blade before the tower along at least one axis X, Y, Z. According to the invention, the analysis module continuously conducts routine analysis operations on the measured vibration phenomena and makes it possible to determine whether the wind turbine is in an operating period by identifying vibrations V3P.

According to one particularity of the first feature of the first aspect of the invention, the analysis module identifies vibrations V3P after a refining operation on the measured acceleration data. More particularly, the refining operation comprises:

a step for projecting the gathered acceleration data into a three-dimensional coordinate system X", Y", Z" of the rotor;

a step for forming a frequency spectrum of the acceleration data projected into the three-dimensional coordinate system X", Y", Z" of the rotor;

a step for oversampling the frequency spectrum; and a step for selecting peaks corresponding to vibrations V3P, which is done by taking the product of each peak of the oversampled frequency spectrum times the peak of at least the first five harmonics of said peak.

According to a second feature of the first aspect of the invention, the processing system comprises a periodicity module suitable for determining and recording a regular period of rotation Tr of the rotor that corresponds to a stable plurality of operating periods Tf of the wind turbine. This stable plurality of operating periods Tf is determined as a function of the identified vibrations V3P.

To that end, the periodicity module scans vibrations V3P identified during an operating period Tf so as to detect at least one vibration V3P with a frequency close to a reference frequency 3P of the wind turbine. Thus, when the periodicity module detects at least one vibration V3P with a frequency close to the value of the theoretical frequency 3P of the wind turbine, the periodicity module preselects operating period Tf.

Given that context, when the periodicity module selects a threshold number NS of operating periods Tf which follow each other chronologically, the periodicity module records a regular period of rotation Tr of the rotor.

According to a third feature of the first aspect of the invention, the processing system comprises a frequency processing module for quantifying vibrations V1P of the nacelle due to an imbalance of the rotor over a stable plurality of operating periods Tf of the wind turbine, according to at least two axes X", Y", Z". More specifically, the frequency module quantifies vibrations V1P of the nacelle over a stable plurality of operating periods Tf of the wind turbine corresponding to a regular recorded period of rotation Tr.

For that purpose, the frequency processing module quantifies vibrations V1P with a frequency close to a reference frequency 1P of the wind turbine.

According to a fourth feature of the first aspect of the invention, the processing system comprises a calculation module for determining the rotor imbalance as a function of vibrations V1P according to at least two axes X", Y", Z" which have been quantified over a stable plurality of operating periods Tf of the wind turbine. Preferably, vibrations V1P are quantified over a specified number Nd of regular recorded periods of rotation Tr.

Advantageously, the acceleration data measured over a stable plurality of operating periods of the wind turbine, that is, periods in which the rotor is rotating at a regular speed, makes it possible to determine a rotor imbalance over a large number of operating periods and thus increase the accuracy of the diagnosis. Indeed, processing a large number of operating periods reduces the impact of variations in the measured vibration phenomena due to the external conditions to which the wind turbine is exposed. Processing of the data over a stable plurality of operating periods also helps to determine the rotor imbalance of the wind turbine without needing to modify the operating settings of the wind turbine.

The diagnostic system according to the invention makes it possible to determine the rotor imbalance based solely on acceleration data that can be measured without having to stop energy production and without having to take action on the wind turbine and its settings.

The calculation module determines an aerodynamic imbalance of the rotor and a mass imbalance of the rotor which together determine the rotor imbalance, based on vibrations V1 P for at least two of the axes X", Y", Z".

Advantageously, the diagnostic system performs simultaneous processing of acceleration data V1P for at least two axes, making it possible to simultaneously determine the aerodynamic and mass imbalance of the rotor.

According to one particularity of the preceding four features of the first aspect of the invention, the analysis module, the periodicity module, the frequency processing module, and the calculation module are algorithms designed to be executed by at least one computer terminal.

According to a fifth feature of the first aspect of the invention, the measurement device is arranged on an axis parallel to the longitudinal axis of the nacelle. This positioning of the measurement device makes it possible to project the acceleration data into the three-dimensional coordinate system of the rotor.

A second aspect of the invention relates to a method for diagnosing a rotor imbalance of a wind turbine based on acceleration data measured on a wind turbine nacelle supported by a tower, characterized in that it comprises:

a step for routinely and continuously measuring acceleration data along the three axes X, Y, Z corresponding to the vibration phenomena occurring on the nacelle; and a step for processing the acceleration data so as to determine the rotor imbalance through a vibration analysis based solely on the acceleration data measured for at least two of the axes X, Y, Z on the nacelle without altering the normal operation of the wind turbine.

According to a first feature of the second aspect of the invention, the acceleration data processing step comprises:

an operation for continuously analyzing the acceleration data in order to determine a stable operating period Tf of the wind turbine, and an operation for determining a stable plurality of operating periods Tf of the wind turbine, with the rotor imbalance being determined during said stable plurality of operating periods Tf of the wind turbine, which is defined by a stable frequency 3P of the blades passing by the tower.

In particular, an operating period Tf is determined when vibrations V3P due to the passing of a blade in front of the tower according to at least one axis X, Y, Z are identified.

BRIEF DESCRIPTION OF THE SEVERAL VIEWS OF THE DRAWINGS

Other particularities and advantages will become clear from the following detailed description of a non-limiting embodiment of the invention, which is shown in FIGS. 1 to 9 appended hereto.

DETAILED DESCRIPTION OF THE INVENTION

The invention relates to a diagnostic system 1 for diagnosing a rotor imbalance of a wind turbine.

As a general rule, a wind turbine is made of a tower that is anchored to the ground or to seabeds. The tower supports a nacelle on which the rotor is mounted. The rotor lies along a longitudinal axis which is one and the same as the axis of rotation X" thereof and has a pitch angle with respect to the longitudinal axis X' of the nacelle. As a general rule, the pitch angle of the axis of rotation X" of the rotor is 5°. Here, and in most cases, the rotor comprises three blades.

Figure 1:
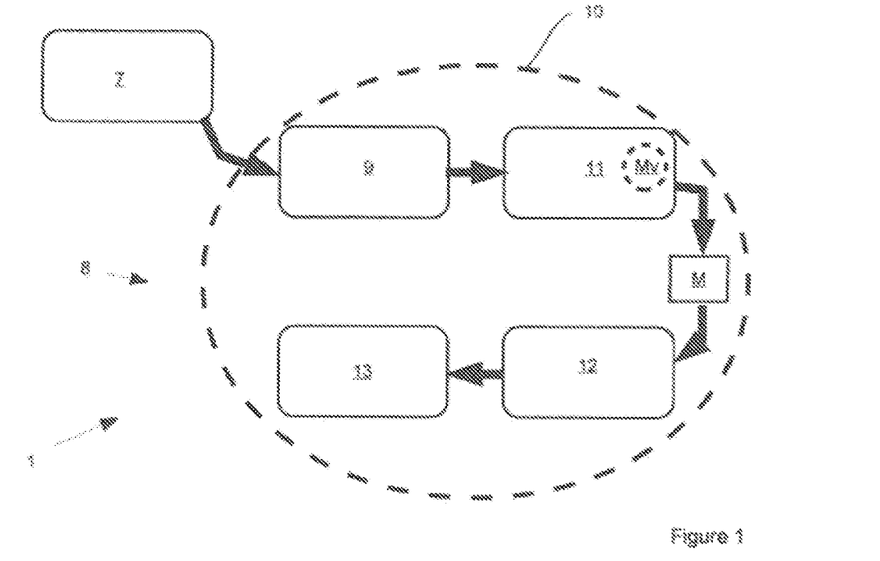
FIG. 1 is a schematic view of a representation of a system for diagnosing the rotor imbalance of a wind turbine, which conforms to an embodiment of the invention.
Figure 9:
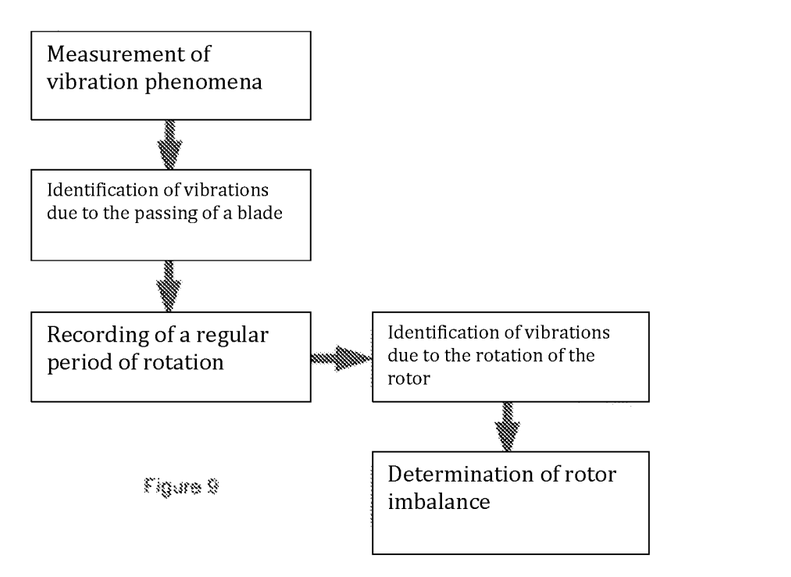
FIG. 9 is a schematic view of a representation of a method for diagnosing the rotor imbalance of a wind turbine carried out by the diagnostic system of FIG. 1.

As shown in FIGS. 1 and 9, by means of a diagnostic method, diagnostic system 1 determines the rotor imbalance based on acceleration data measured at the nacelle of the wind turbine. The acceleration data correspond to vibration phenomena experienced by the nacelle during operation of the wind turbine. There may be multiple sources of a vibration phenomenon and they may depend on weather conditions, disturbances induced by the rotation of the rotor, or disturbances induced by the blade passing in front of the tower, and so on.

Figure 2:
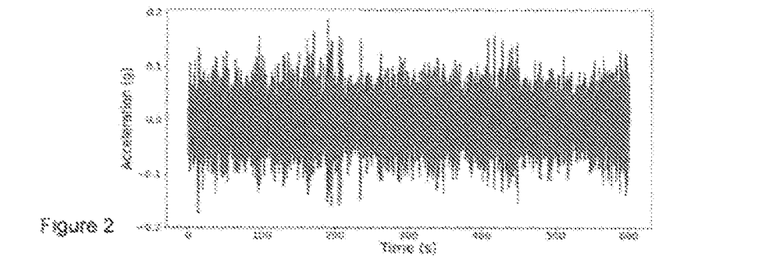
FIG. 2 is a graph illustration of a raw vibration signal of acceleration data.

As shown in FIG. 1, to measure the vibrations felt by the nacelle, diagnostic system 1 comprises a measurement device 7 which is provided with a vibration sensor with three measurement axes X, Y, Z. The vibration sensor measures acceleration data corresponding to vibration phenomena. The measured acceleration data may be represented in the form of a raw vibration signal as shown in FIG. 2. Here, the vibration sensor is made of an accelerometer with three measurement axes X, Y, Z.

Measurement device 7 is positioned on the nacelle so that one of the measurement axes X, Y, Z of the vibration sensor is positioned so as to be parallel to the longitudinal axis X'. Here, measurement axis X is positioned so as to be parallel to longitudinal axis X'. Preferably, measurement device 7 is rigidly attached to a weather mast of the wind turbine.

Once in place, measurement device 7 is turned on and performs an operation of continuous routine measurement of the acceleration data along the three measurement axes X, Y, Z.

Measurement device 7 is designed to transfer the acceleration data measured on the nacelle to a processing system 8, which is designed to determine the rotor imbalance based on the measured acceleration data of at least two axes (X", Y", Z").

In the example shown in FIG. 1, processing system 8 comprises an analysis module 9 which receives the acceleration data transferred by measurement device 7.

In addition, measurement device 7 may comprise a memory allowing it to store the locally gathered data.

Here, analysis module 9 is an algorithm stored and executed by a computer terminal 10, which may be on the wind turbine or located remotely with respect to the wind turbine.

If computer terminal 10 is located away from the wind turbine, measurement device 7 comprises telecommunication network transmission means, such as GSM or satellite.

In order to limit work on the nacelle of the wind turbine, measurement device 7 obtains electrical power from a battery or the wind turbine.

More specifically, analysis module 9 is built into diagnostic system 1 and is designed to continuously analyze the acceleration data transmitted by measurement device 7 so as to determine an operating period Tf of the wind turbine. Preferably, operating period Tf is between 15 seconds and 90 seconds and operating period Tf is preferably between 20 and 60 seconds.

An operating period Tf is determined when analysis module 9 identifies vibrations V3P of the nacelle, according to at least one of axes X, Y, Z, induced by the passing of a blade in front of the tower.

Figures 3, 4:
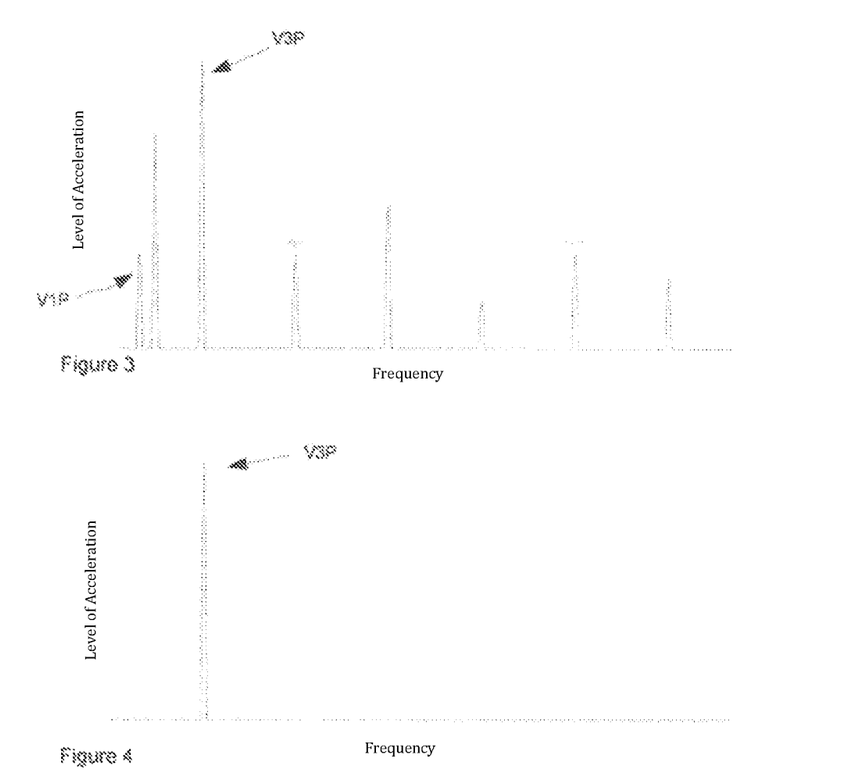
FIG. 3 is a simplified graph illustration of an oversampled frequency spectrum of acceleration data.
FIG. 4 is a simplified graph illustration of a transformed frequency spectrum.

For this purpose, analysis module 9 carries out a refining method on the acceleration data, which provides a frequency spectrum as shown in FIG. 3. The frequency spectrum of FIG. 3 comprises the frequency of the measured vibration on the X-axis and, on the Y-axis, the acceleration level of the vibration signal corresponding to the intensity of the measured vibration.

The method for refining the measured acceleration data makes it possible to highlight vibrations V3P of the nacelle, corresponding to the vibrations induced by the passing of a blade in front of the wind turbine tower, as a function of their acceleration level and their frequency.

To that end, the refining method uses a series of processing operations to improve the legibility of the frequency spectrum so that only vibrations V3P, corresponding to the passing of a blade in front of the tower, remain. In the example of FIG. 4, only one peak remains; this peak is for a vibration V3P of the nacelle.

From this perspective, the refining method comprises a first operation of projecting the acceleration data into a three-dimensional coordinate system X', Y', Z' of the nacelle. The gravity vector G, which is considered to be relatively constant by nature and corresponds to the Z'-axis of the nacelle.

In addition, gravity vector G is used as a reference for projecting acceleration data X, Y, Z into the three-dimensional coordinate system X',Y',Z' of the nacelle, by means of a first rotation matrix.

Regardless of the angle of measurement device 7, the projection of the acceleration data into the X', Y', Z' coordinate system makes it possible to have the Z'-axis correspond to gravity vector G.

The refining method comprises a second projection operation that uses a second rotation matrix to project the acceleration data from the three-dimensional coordinate system X', Y', Z' of the nacelle to a three-dimensional coordinate system X", Y", Z" of the rotor. As indicated earlier, the rotor has a pitch angle with respect to the nacelle; this second projection into the three-dimensional coordinate system X", Y", Z" projects the acceleration data into the rotor plane.

The two acceleration-data projection operations both limit the positioning constraints of measurement device 7 and also project the acceleration data into the three-dimensional coordinate system X", Y", Z" of the rotor, in which the stresses of the rotor imbalance are felt.

The refining method comprises an operation for forming a frequency spectrum of the acceleration data projected into the three-dimensional coordinate system X", Y", Z" of the rotor. Typically, the operation of forming the frequency spectrum may be conducted with the help of a Fourrier transform.

To improve the resolution of the frequency spectrum, the refining method comprises a step for oversampling the frequency spectrum. This oversampling step helps to improve accuracy when identifying the peaks and/or signals corresponding to vibrations V3P (shown in FIG. 3).

The refining method comprises an operation for identifying signals corresponding to vibrations V3P of the nacelle. To complete this operation, analysis module 9 generates a converted frequency spectrum by taking the product of each peak and/or signal of the oversampled frequency spectrum times the peak and/or signal of at least the first five harmonics of said peak and/or signal.

Indeed, only vibrations induced by the passing of a blade in front of the tower excite the fundamental vibration frequency and at least five of its first harmonics on the X"-axis. Consequently, the product of each peak and/or signal of the oversampled frequency spectrum times the peak and/or signal of at least the first five harmonics of the oversampled frequency spectrum leaves only vibrations V3P, corresponding to the passing of a blade in front of the tower, remaining.

Analysis module 9 identifies the fundamental of vibrations V3P by selecting significant peaks in relation to the noise of the converted frequency spectrum shown in FIG. 4. In practice, each significant peak corresponds to a vibration V3P and significant peaks can be selected over a predetermined frequency range that depends on the wind turbine manufacturer's data. For example, analysis module 9 can be configured to select significant peaks when they fall within a frequency range of 0.1 Hz to 2 Hz.

Using the refining method, analysis module 9 determines a frequency 3P of the rotor by extracting the fundamental of vibrations V3P from the acceleration data measured by measurement device 7. Rotor frequency 3P corresponds to the frequency of a blade passing in front of the tower.

As shown in FIG. 1, processing system 8 comprises a periodicity module 11 which is suitable for recording a regular period of rotation Tr of the rotor as a function of identified vibrations V3P in memory M of computer terminal 10. Memory M of computer terminal 10 may consist of a hard drive or a flash memory.

In the present example, periodicity module 11 is an algorithm stored and executed by computer terminal 10.

By means of an analysis method for analyzing vibrations V3P identified over a converted frequency spectrum of operating periods Tf that follow each other, periodicity module 11 creates and records a period Tr in memory M of computer terminal 10.

To that end, the analysis method carried out by periodicity module 11 comprises an operation to scan vibrations V3P identified over the converted frequency spectrum of an operating period Tf. In the scanning operation, periodicity module 11 compares the frequency of identified vibrations V3P to a reference frequency 3P of the wind turbine.

Here, reference frequency 3P of the wind turbine corresponds to a theoretical frequency 3P which depends on the type of wind turbine and is a matter of known manufacturer data. Theoretical frequency 3P corresponds, for example, to the value of frequency 3P during a nominal operation of the rotor, in which the stresses caused by the rotor imbalance are exerted to a maximum degree on the rotor.

When periodicity module 11 detects at least one vibration V3P, over a converted frequency spectrum of an operating period Tf, having a frequency close to reference frequency 3P of the wind turbine, periodicity module 11 completes an operation for preselecting said operating period Tf. In practice, said preselected operating period Tf is stored temporarily and/or permanently in a memory Mv of periodicity module 11.

Memory Mv of periodicity module 11 may consist of random access memory, a hard drive, or a flash memory.

When periodicity module 11 preselects a threshold number NS of operating period Tf which follow each other chronologically, periodicity module 11 completes an assembly operation on threshold number NS of successive operating periods Tf to create a regular period of rotation Tr of the rotor.

In the present example, threshold number NS of preselected operating periods Tf, which is necessary to create a regular period of rotation Tr, may be between 5 and 30 preselected operating periods Tf and preferably between 10 and 20 preselected operating periods Tf.

Here, each regular period of rotation Tr determined by a vibration analysis corresponds to a period of 2 to 15 minutes during which the rotor is turning at a regular speed.

In this example, periodicity module 11 records each period Tr in memory M of computer terminal 10.

In addition, in the example of FIG. 1, processing system 8 of diagnostic system 1 comprises a frequency processing module 12 for determining vibrations V1P of the nacelle that are induced by the rotor imbalance.

In the present example, frequency processing module 12 is an algorithm stored and executed by computer terminal 10.

By means of a frequency processing method applied to a regular period of rotation Tr recorded in memory M, frequency processing module 12 determines vibrations V1P having a frequency close to a reference frequency 1P of the wind turbine.

Frequency 1P corresponds to the rotational speed of the rotor. When the rotational speed of the rotor is stable, frequency 1P is also stable.

In addition, in this example reference frequency 1P of the wind turbine corresponds to a theoretical frequency 1P which depends on the type of wind turbine and is a matter of known manufacturer data. Theoretical frequency 1P corresponds, for example, to the value of frequency 1P during nominal operation of the rotor, in which the stresses caused by the rotor imbalance are exerted to a maximum degree on the rotor.

Over a regular period of rotation Tr, frequency processing module 12 quantifies vibrations V1P having a value of between −20% and +20% of reference frequency 1P, preferably frequency processing module 12 quantifies vibrations V1P having a value of between −15% and +15% of reference frequency 1P, and preferably frequency processing module 12 quantifies vibrations V1P having a value of between −10% and +5% of reference frequency 1P.

To that end, frequency processing module 12 completes a step to quantify the acceleration level of axial and transverse vibrations V1P around reference frequency 1P, i.e. quantification of the vibrational intensity of axial vibrations V1P along the X"-axis, and transverse vibrations V1P along the Y"-axis.

In the example shown in FIG. 1, processing system 8 of diagnostic system 1 comprises a calculation module 13 for determining the rotor imbalance as a function of axial and transverse vibrations V1P for a determined number Nd of regular periods of rotation Tr recorded in memory M.

Here, calculation module 13 is an algorithm stored and executed by computer terminal 10.

In this example, determined number Nd of regular periods of rotation Tr is between 100 and 400, and preferably determined number Nd of regular periods of rotation Tr is between 200 and 300.

To determine the rotor imbalance, calculation module 13 conducts statistical processing operations making it possible to obtain an overall value of axial and transverse vibrations V1P for the determined number Nd of regular periods of rotation Tr in memory M. In this example, calculation module 13 independently processes the overall values of axial and transverse vibrations V1P.

It is known that the rotor imbalance of a wind turbine comprises two components, an aerodynamic imbalance of the rotor and a mass imbalance of the rotor.

It has been demonstrated that axial vibrations V1P are primarily the resultant of the aerodynamic imbalance and are primarily induced by a differing aerodynamic behavior between the blades of the wind turbine. Axial vibrations V1P vary with the force of the wind. In addition, the aerodynamic imbalance of a rotor may be due to an error in installing the blades, such as a pitch angle offset of one or more blades, a deformation of the blades that may be induced by lightning strikes, differential wear of the blades, or a manufacturing difference between blades.

In the case of transverse vibrations V1P, they result primarily from a mass imbalance of the rotor and are primarily induced by the rotation of the rotor. The mass imbalance of the rotor may be due to a problem of cracks in the blade, which may promote an accumulation of water in the blade, or a depositing of material on the blades, such as frost.

Figure 5:
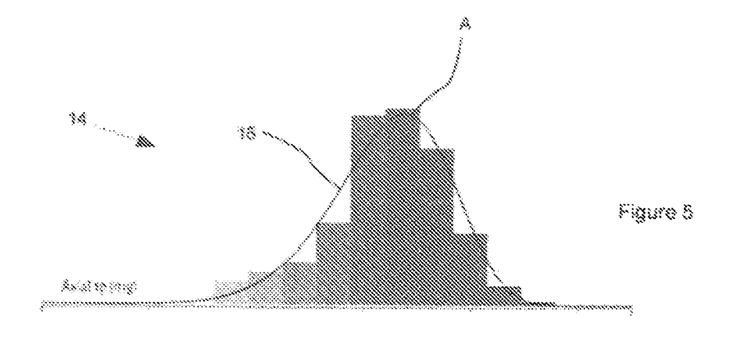
FIG. 5 is a graph representation of a histogram corresponding to a distribution of the quantified axial vibrations of the rotor for which a Weibull adjustment has been made.

FIG. 5 shows a distribution of axial vibrations V1P for the determined number Nd of regular periods of rotation Tr according to a first histogram 14. Histogram 14 shows the acceleration values of axial vibrations V1P on the X-axis and the proportion and/or quantity of axial vibrations V1P on the Y-axis. The distribution is created by calculation module 13.

In order to determine an overall value of axial vibrations V1P, the distribution of axial vibrations V1P in histogram 14 needs to be interpreted.

As indicated earlier, when the speed of the rotor is constant, the specificity of the distribution of axial vibrations V1P is due to different wind speeds applied to the rotor and blades. To interpret such a phenomenon, calculation module 13 uses a statistical model such as Weibull's law. An overall value of axial vibrations V1P is determined by calculating parameter A of Weibull's law, which represents the characteristic value of the distribution of values of axial vibrations V1P.

In the example shown in FIG. 5, calculation module 13 adjusts a Weibull curve 16 to the distribution of axial vibrations V1P so as to determine parameter A of the adjusted Weibull curve.

Figure 6:
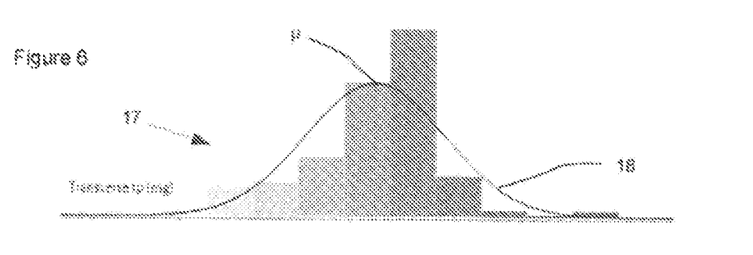
FIG. 6 is a graph representation of a histogram corresponding to a distribution of the quantified transverse vibrations of the rotor for which a Gaussian adjustment has been made.

FIG. 6 shows a distribution of transverse vibrations V1P for the determined number Nd of regular periods of rotation Tr according to a second histogram 17. Histogram 17 shows the acceleration values of transverse vibrations V1P on the X-axis and the proportion and/or quantity of transverse vibrations V1P on the Y-axis. The distribution is created by calculation module 13.

In order to determine an overall value of transverse vibrations V1P, the distribution of transverse vibrations V1P in histogram 17 needs to be interpreted.

As indicated earlier, transverse vibrations V1P vary primarily with the rotational speed of the rotor. However, the selected regular periods of rotation Tr are characterized by a constant rotational speed of the rotor. As a matter of fact, and as shown in FIG. 6, the distribution of transverse vibrations V1P in histogram 17 shows a classic Gaussian distribution profile. In this context, a Gaussian function is a relevant model for determining an overall characteristic value of the distribution of transverse vibrations V1P.

Consequently, calculation module 13 adjusts a Gaussian curve 18 to histogram 17 of the distribution of transverse vibrations V1P using a Gaussian function. In this example, the overall value of transverse vibrations V1P corresponds to the average value μ of adjusted Gaussian curve 18.

Furthermore, as mentioned earlier, the aerodynamic imbalance is the primary source of axial vibrations V1P. It is known that the mass imbalance of the rotor is also an ancillary source of axial vibrations V1 P. However, in proportion to the aerodynamic imbalance of the rotor, the mass imbalance of the rotor is a smaller portion of the intensity of axial vibrations V1P.

Conversely, the primary source of transverse vibrations V1P is the mass imbalance of the rotor, with the aerodynamic imbalance of the rotor constituting an ancillary source of transverse vibrations V1P. However, in proportion to the mass imbalance of the rotor, the aerodynamic imbalance of the rotor is a smaller portion of the intensity of transverse vibrations V1P.

In this context, given the same determined number Nd of regular periods of rotation Tr, calculation module 13 performs a correction operation on the overall values of axial A and transverse μ vibrations V1P with respect to each other.

Preferably, the correction operations on the overall values of the axial A and transverse μ vibrations are independent.

To that end, calculation module 13 may use a logistic function for calculating a correction coefficient of each overall value A, μ.

Figure 7:
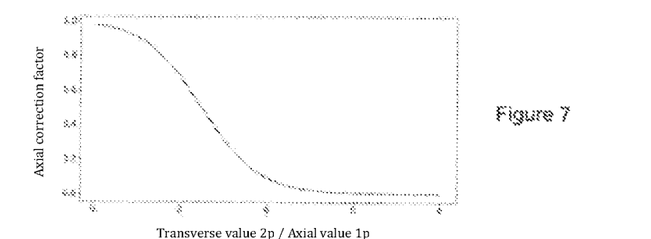
FIG. 7 is a graph illustration of an axial correction factor.

In the example of FIG. 7, it is shown graphically, in the form of a curve of an axial correction coefficient of overall value A. Here, the axial correction coefficient is between 0 and 1. In practice, the closer the axial correction coefficient is to a value of 1, the smaller the proportion of transverse vibrations V1P in the intensity of the axial vibration phenomena.

In order to obtain the correction coefficient of overall value A, calculation module 13 may use the following logistic function:

$$\text{axial correction factor } (x) = \frac{1}{1 + c^{-k*(x-x_0)}}$$

where x=(overall values μ transverse V1P/overall values A axial V1P), and c=0.25, k=1.1, $x_0$=2.5, which may be used as coefficient values for a given type of wind turbine.

Calculation module 13 determines the aerodynamic imbalance of the rotor as a function of the product of the overall value A of axial vibrations V1P times the axial correction coefficient.

Figure 8:
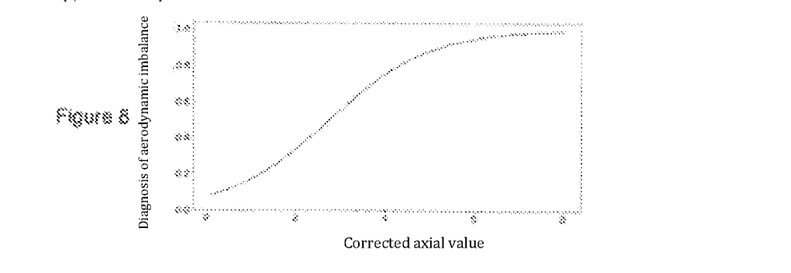
FIG. 8 is a graph illustration of a distribution curve of the rotor's aerodynamic imbalance.

In the example of FIG. 8, the aerodynamic imbalance is shown graphically by a curve with a value varying between 0 and 1. A value of 0 corresponds to a perfect balance of the rotor, while a value of 1 corresponds to a maximum theoretical imbalance which cannot be reached. In practice, when diagnostic system 8 finds an aerodynamic imbalance that is greater than a value of between 0.2 and 0.3, servicing of the wind turbine in question is recommended to avoid damage to the blades or rotor.

Calculation module 13 uses a logistic function to determine the aerodynamic imbalance of the rotor:

$$\text{aerodynamic imbalance diagnosis } (x) = \frac{1}{1 + e^{-k*(x-x_0)}}$$

where x=overall value A axial V1P*axial correction factor (overall_transverse_value_V1P/overall_axial_value_V1P), and k=0.9, $x_0$=2.75, which may be used as coefficient values for a given type of wind turbine.

Here, the axial and transverse values V1p are expressed in mg (millig), with the millig being a unit of acceleration.

Likewise, calculation module 13 determines a transverse correction coefficient of the overall value p using, for example, a logistic function of the same type as that described for the axial correction coefficient:

$$\text{transverse correction factor } (x) = \frac{1}{1 + c^{-k*(x-x_0)}}$$

where x=(overall value A axial V1P/overall value μ transverse V1P), and c=0.2, k=1.1, $x_0$=1.75, which may be used as coefficient values for a given type of wind turbine.

From a graphic point of view, the transverse correction factor has a curve profile similar to that of the axial correction factor shown in FIG. 7.

Similarly, the closer the transverse correction coefficient is to a value of 1, the smaller the proportion of axial vibrations V1P in the intensity of the transverse vibration phenomena.

Calculation module 13 determines the mass imbalance as a function of the product of the transverse correction coefficient times the overall value of transverse vibrations V1P. The mass imbalance of the rotor is determined by means of a logistic function of the same type as that used to determine the aerodynamic imbalance:

$$\text{mass imbalance diagnosis } (x) = \frac{1}{1 + e^{-k*(x-x_0)}}$$

where x=overall value μ transverse V1P*transverse correction factor (overall_axial_value_V1P/overall transverse_value_V1P), and k=0.7, $x_0$=2.25, which may be used as coefficient values for a given model of wind turbine.

The mass imbalance of the rotor may also be expressed on a scale of 0 to 1 according an interpretation similar to the aerodynamic imbalance of the rotor. That is, a value of 0 corresponds to a perfect balance of the rotor, while a value of 1 corresponds to a maximum theoretical imbalance which cannot be reached.

From a graphic point of view, the mass imbalance of the rotor has a curve profile similar to that of the aerodynamic imbalance shown in FIG. 8.

In practice, when the diagnostic system finds a mass imbalance that is greater than values of between 0.2 and 0.3, servicing of the wind turbine in question is likewise recommended to avoid damage to the blades and/or rotor.

Diagnostic system 1 runs continuously and continuously sends data in real time to the operators of wind farms.

Diagnostic system 1 determines the aerodynamic and mass imbalance of the rotor using a diagnostic method, without altering the normal operation of the wind turbine. In other words, the aerodynamic and mass imbalance of the rotor is determined without changing the operating settings of the wind turbine. Consequently, as an example, the diagnostic system and method do not require any modification of the pitch angle of the rotor to determine the rotor imbalance.

Wind farm operators can optimize the management of their wind farms using the information they receive. In particular, the diagnostic system makes it possible to guide wind farm operators in their wind farm maintenance approaches by identifying wind turbines with a rotor imbalance.

We claim:

1. A diagnostic system for diagnosing a rotor imbalance of a wind turbine based on acceleration data measured on a wind turbine nacelle supported by a tower, comprising:
    a measurement device equipped with a triaxial vibration sensor which takes continuous, routine measurements of the acceleration data in at least two axes corresponding to vibration phenomena occurring on the nacelle; and
    a processing system for the acceleration data for determining the rotor imbalance through a vibration analysis based solely on the acceleration data in at least two axes at the nacelle without altering the normal operation of the wind turbine,
    wherein the processing system comprises an analysis module that continuously analyzes acceleration data measured by the measurement device in order to determine a stable operating period of the wind turbine, with the rotor imbalance being determined over a stable plurality of operating periods of the wind turbine, which is defined by a stable frequency of the blades passing in front of the tower,
    wherein the analysis module determines an operating period when vibrations are identified due to the passing of a blade in front of the tower according to at least one axis, and
    wherein the analysis module identifies the vibrations, after a refining operation to refine the measured acceleration data, with the refining operation comprising:
        a step for projecting the gathered acceleration data into a three-dimensional coordinate system of the rotor;
        a step for forming a frequency spectrum of the acceleration data projected into the three-dimensional coordinate system of the rotor;
        a step for oversampling the frequency spectrum; and
        a step for selecting peaks corresponding to vibrations, which is done by taking the product of each peak of the oversam pled frequency spectrum times the peak of at least the first five harmonics of said peak.

2. The diagnostic system, according to claim 1, wherein the processing system comprises a periodicity module suitable for determining and recording a regular period of rotation of the rotor that corresponds to a stable plurality of operating periods of the wind turbine.

3. The diagnostic system according to claim 2,
    wherein the periodicity module scans the vibrations identified during an operating period so as to detect at least one vibration with a frequency close to a reference frequency of the wind turbine; and
    wherein, when the periodicity module detects at least one vibration with a frequency close to said reference frequency of the wind turbine, the periodicity module preselects the operating period.

4. A diagnostic system for diagnosing a rotor imbalance of a wind turbine based on acceleration data measured on a wind turbine nacelle supported by a tower, comprising:
    a measurement device equipped with a triaxial vibration sensor which takes continuous, routine measurements of the acceleration data in at least two axes corresponding to vibration phenomena occurring on the nacelle; and
    a processing system for the acceleration data for determining the rotor imbalance through a vibration analysis based solely on the acceleration data in at least two axes at the nacelle without altering the normal operation of the wind turbine,
    wherein the processing system comprises an analysis module that continuously analyzes acceleration data measured by the measurement device in order to determine a stable operating period of the wind turbine, with the rotor imbalance being determined over a stable plurality of operating periods of the wind turbine, which is defined by a stable frequency of the blades passing in front of the tower,
    wherein the processing system comprises a periodicity module suitable for determining and recording a regular period of rotation of the rotor that corresponds to a stable plurality of operating periods of the wind turbine, and
    wherein, when the periodicity module selects a threshold number of operating periods which follow each other chronologically, the periodicity module records a regular period of rotation of the rotor.

5. The diagnostic system, according to claim 2 claim 4, wherein the analysis module determines an operating period when vibrations are identified due to the passing of a blade in front of the tower according to at least one axis.

6. The diagnostic system, according to claim 1, wherein the processing system comprises a frequency processing module for quantifying vibrations of the nacelle due to an imbalance of the rotor over a stable plurality of operating periods of the wind turbine, according to the acceleration data in the at least two axes.

7. The diagnostic system, according to claim 6, wherein the frequency processing module quantifies vibrations with a frequency close to a reference frequency of the wind turbine.

8. The diagnostic system, according to claim 6, wherein the processing system comprises a calculation module for determining the rotor imbalance as a function of vibrations according to the acceleration data in the at least two axes, which have been quantified over a stable plurality of operating periods of the wind turbine.

9. The diagnostic system, according to claim 8, wherein the calculation module determines an aerodynamic imbalance of the rotor and a mass imbalance of the rotor which together form the rotor imbalance, based on vibrations quantified according to the acceleration data in the at least two axes.

10. The diagnostic system, according to claim 8, wherein the analysis module, the periodicity module, the frequency processing module, and the calculation module are algorithms executed by at least one computer terminal.

11. A diagnostic method for diagnosing a rotor imbalance of a wind turbine based on acceleration data measured on a wind turbine nacelle supported by a tower, the method comprising the steps of:
routinely and continuously measuring acceleration data with a diagnostic system of claim 1, said measuring device routinely and continuously measuring acceleration data along three axes corresponding to the vibration phenomena occurring on the nacelle; and
processing the acceleration data with said processing system so as to determine the rotor imbalance through a vibration analysis based solely on the acceleration data measured for at least two axes of the three axes on the nacelle without altering the normal operation of the wind turbine.

12. The diagnostic method, according to claim 11, wherein the step for processing the acceleration data comprises:
continuously analyzing the acceleration data in order to determine a stable operating period of the wind turbine, and
determining a plurality of stable operating periods of the wind turbine, which is defined by a stable frequency of the blades passing in front of the tower, with the rotor imbalance being determined during said stable plurality of operating periods of the wind turbine.

13. The diagnostic method, according claim 12, wherein an operating period is determined when vibrations due to the passing of a blade in front of the tower according to at least one axis of the three axes are identified.

* * * * *